(12) United States Patent
Fu et al.

(10) Patent No.: US 11,670,108 B2
(45) Date of Patent: Jun. 6, 2023

(54) IMAGE SENSING DEVICE AND FINGERPRINT SENSING METHOD

(71) Applicant: Guangzhou Tyrafos Semiconductor Technologies Co., LTD, Guangzhou (CN)

(72) Inventors: Hsu-Wen Fu, Kaohsiung (TW); Ping-Hung Yin, Taipei (TW)

(73) Assignee: Guangzhou Tyrafos Semiconductor Technologies Co., LTD, Guangzhou (CN)

(*) Notice: Subject to any disclaimer, the term of this patent is extended or adjusted under 35 U.S.C. 154(b) by 0 days.

(21) Appl. No.: 17/691,144

(22) Filed: Mar. 10, 2022

(65) Prior Publication Data

US 2022/0351537 A1 Nov. 3, 2022

Related U.S. Application Data

(60) Provisional application No. 63/180,668, filed on Apr. 28, 2021.

(30) Foreign Application Priority Data

Jan. 11, 2022 (TW) .................................. 111101092

(51) Int. Cl.
*G06V 40/13* (2022.01)
*G06V 10/141* (2022.01)
(Continued)

(52) U.S. Cl.
CPC ........ *G06V 40/1318* (2022.01); *G06V 10/141* (2022.01); *G06V 40/1365* (2022.01); *H04N 25/50* (2023.01); *H04N 25/709* (2023.01)

(58) Field of Classification Search
CPC ............ G06V 40/1318; G06V 10/141; G06V 40/1365; H04N 25/50; H04N 25/709
See application file for complete search history.

(56) References Cited

U.S. PATENT DOCUMENTS

2020/0311380 A1 10/2020 Zhang et al.
2021/0056333 A1* 2/2021 Cheng ................... G06F 3/0416

FOREIGN PATENT DOCUMENTS

CN 111626214 9/2020
CN 111651083 9/2020
(Continued)

OTHER PUBLICATIONS

"Office Action of Taiwan Counterpart Application", dated Sep. 29, 2022, p. 1-p. 9.

*Primary Examiner* — Abhishek Sarma
(74) *Attorney, Agent, or Firm* — JCIPRNET

(57) ABSTRACT

An image sensing device and a fingerprint sensing method are provided. The image sensing device is suitable for being installed in an electronic device. The image sensing device includes a light sensor and a controller. The controller is coupled to the light sensor. When the electronic device is operated in a sleep mode, the controller operates the light sensor in a light sensing mode. The controller determines whether a number of signal intensity changes of a photosensitive signal output by the light sensor exceeds a predetermined number of intensity changes within a predetermined length of time, so as to switch the operation of the light sensor in a fingerprint sensing mode.

18 Claims, 5 Drawing Sheets

(51) Int. Cl.
*G06V 40/12* (2022.01)
*H04N 25/50* (2023.01)
*H04N 25/709* (2023.01)

(56) References Cited

FOREIGN PATENT DOCUMENTS

TW 201942801 11/2019
WO 2008040247 4/2008

* cited by examiner

IMAGE SENSING DEVICE AND FINGERPRINT SENSING METHOD

CROSS-REFERENCE TO RELATED APPLICATION

This application claims the priority benefit of the U.S. provisional application Ser. No. 63/180,668, filed on Apr. 28, 2021 and Taiwan application serial no. 111101092, filed on Jan. 11, 2022. The entirety of each of the above-mentioned patent applications is hereby incorporated by reference herein and made a part of this specification.

BACKGROUND

Technical Field

The disclosure relates to a sensing technology, and in particular, to an image sensing device and a fingerprint sensing method.

Description of Related Art

In conventional electronic devices with an optical fingerprint sensing function, an additional sensing element may be adopted as a triggering element in order to trigger optical fingerprint sensing, such as capacitance sensing, pressure sensing, or other optical sensing. Also, when a signal that is similar to a triggering signal is generated, a system of the electronic device is instantly woken to activate a sensing mechanism (e.g. the Face-ID sensing mechanism adopted by Apple iPhone). As a result, the electronic device may be frequently accidentally triggered, leading to unnecessary power consumption and inconvenience for a user.

SUMMARY

The disclosure is directed to an image sensing device and a fingerprint sensing method capable of efficiently operating a light sensor to reduce power consumption.

An image sensing device of the disclosure is suitable for being installed in an electronic device. The image sensing device includes a light sensor and a controller. The controller is coupled to the light sensor. When the electronic device is operated in a sleep mode, the controller operates the light sensor in a light sensing mode, and the controller determines whether a number of signal intensity changes of a photosensitive signal output by the light sensor exceeds a predetermined number of intensity changes within a predetermined length of time to switch operation of the light sensor in a fingerprint sensing mode.

A fingerprint sensing method of the disclosure includes the following. When an electronic device is operated in a sleep mode, a light sensor is operated in a light sensing mode. It is determined whether a number of signal intensity changes of a photosensitive signal output by the light sensor exceeds a predetermined number of intensity changes within a predetermined length of time to switch operation of the light sensor in a fingerprint sensing mode.

Based on the above, the image sensing device and fingerprint sensing method of the disclosure may effectively prevent the electronic device from being woken to perform fingerprint sensing due to an accidental touch of a user, thereby effectively reducing the power consumption of the electronic device.

In order to make the aforementioned features and advantages of the disclosure comprehensible, embodiments accompanied with drawings are described in detail below.

DESCRIPTION OF THE EMBODIMENTS

Figure 1:
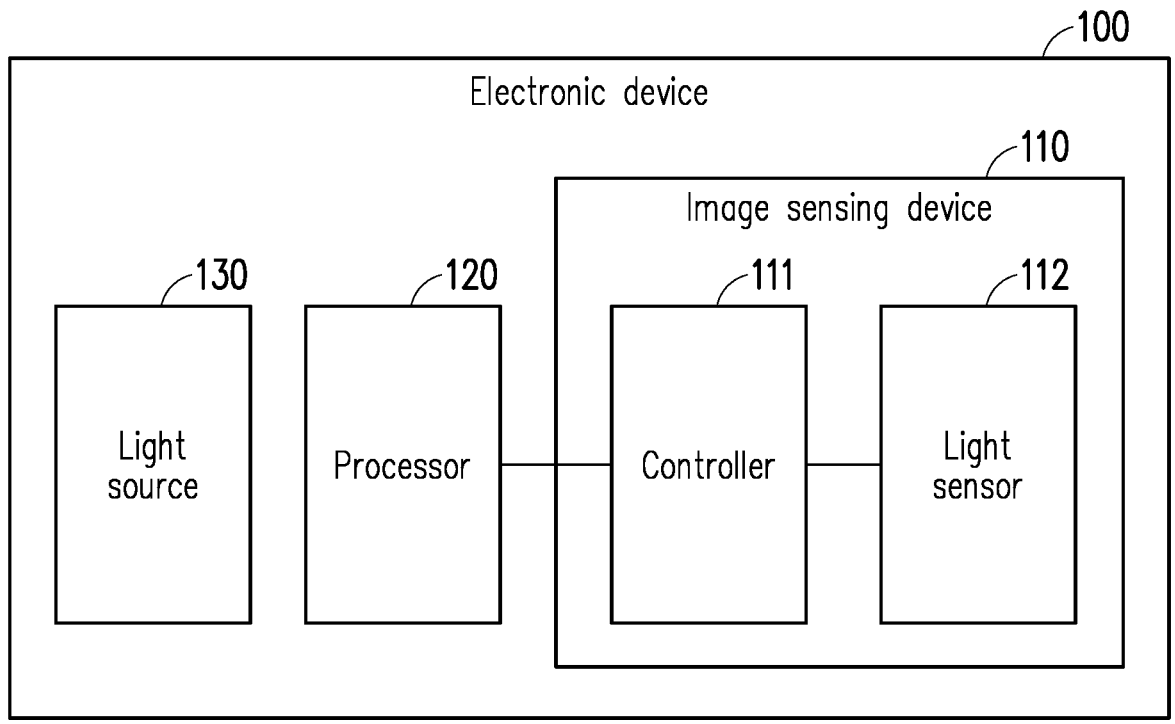
FIG. 1 is a schematic circuit diagram of an image sensing device according to an embodiment of the disclosure.

In order to make the contents of the disclosure easier to understand, the following embodiments are specifically cited as examples on which the disclosure may be implemented. Wherever possible, the originals/components/steps with the same reference numerals in the drawings and embodiments represent the same or similar parts.

FIG. 1 is a schematic circuit diagram of an image sensing device according to an embodiment of the disclosure. Referring to FIG. 1, an electronic device 100 includes an image sensing device 110, a processor 120, and a light source 130. The image sensing device 110 includes a controller 111 and a light sensor 112. The controller 111 is coupled to the light sensor 112 and the processor 120. In the embodiment, the electronic device 100 may be a smartphone with a fingerprint sensing function; however, the disclosure is not limited thereto. The processor 120 may be a central processing unit (CPU) of the smartphone, and the electronic device 100 may include other function circuits or memory. In the embodiment, the image sensing device 110 may be an optical fingerprint sensing module and may be integrated in the electronic device 100 to provide a fingerprint sensing function. In the embodiment, the light source 130 may be disposed in the electronic device 100 and may be an independent illuminating light source corresponding to a fingerprint sensing region, such as a light-emitting diode (LED) or a laser light source. In an embodiment, a touch panel of the imaging sensing device 110 corresponding to the fingerprint sensing region may be a glass cover plate, and the light source 130 may be disposed below the glass cover plate and located at a side of the fingerprint sensing region to cause the illuminating light to be incident to a part of the glass cover plate corresponding to the fingerprint sensing region through total reflection. In another embodiment, the light source 130 may be a display panel of the electronic device 100, such as an organic light-emitting diode (OLED) display panel. In the embodiment, the controller 111 may include, for example, a sensing driving circuit, a fingerprint driving circuit, and related signal processing and functional computing circuit.

The light sensor 112 may be, for example, a complementary metal oxide semiconductor image sensor (CIS). In an embodiment, the image sensing device 110 may be an under-screen fingerprint sensing module, and when the image sensing device 110 performs fingerprint sensing, the electronic device 100 may be woken to illuminate the touch panel to provide the illuminating light required for fingerprint sensing.

In the embodiment, the light sensor 112 may include multiple sensing pixels arranged in an array. The light sensor 112 may be operated in a light sensing mode or a fingerprint sensing mode. The light sensing mode may be a light fidelity (Li-Fi) mode or an illumination detection mode (or referred to as an environment light detection mode). In the embodiment, when the light sensor 112 is operated in the light sensing mode, the light sensor 112 may continuously detect a light signal intensity change through at least one of the multiple sensing pixels. The controller 111 may, for example, operate the same (or at least a part of) sensing pixel of the light sensor 112 to perform sensing continuously and monitor whether a number of signal intensity changes of a photosensitive signal of the one (or at least the part of) sensing pixel exceeds a predetermined number of intensity changes within a predetermined length of time. Hence, it is determined whether a current user desires to operate the electronic device 100 normally to wake the processor 120 of the electronic device 100 and perform fingerprint sensing to further perform screen unlocking operation. When the light sensor 112 is operated in the light sensing mode, the light sensor 112 may use only one or a part of the sensing pixels to perform light sensing operation without turning on all the sensing pixels so that a light sensing function with low power consumption may be achieved.

It is worth noting that, in the light sensing mode of the embodiment, the light source 130 may provide a first illuminating light to illuminate the fingerprint sensing region of a finger so that the light sensor 112 may effectively perform the light sensing operation. In addition, in the fingerprint sensing mode of the embodiment, the light source 130 may provide a second illuminating light to illuminate the fingerprint sensing region of the finger so that the light sensor 112 may effectively obtain a corresponding fingerprint image. A brightness of the first illuminating light may be lower than or equal to a brightness of the second illuminating light. In an embodiment, the brightness of the first illuminating light may be low, and the brightness of the second illuminating light may be normal.

Figure 2:
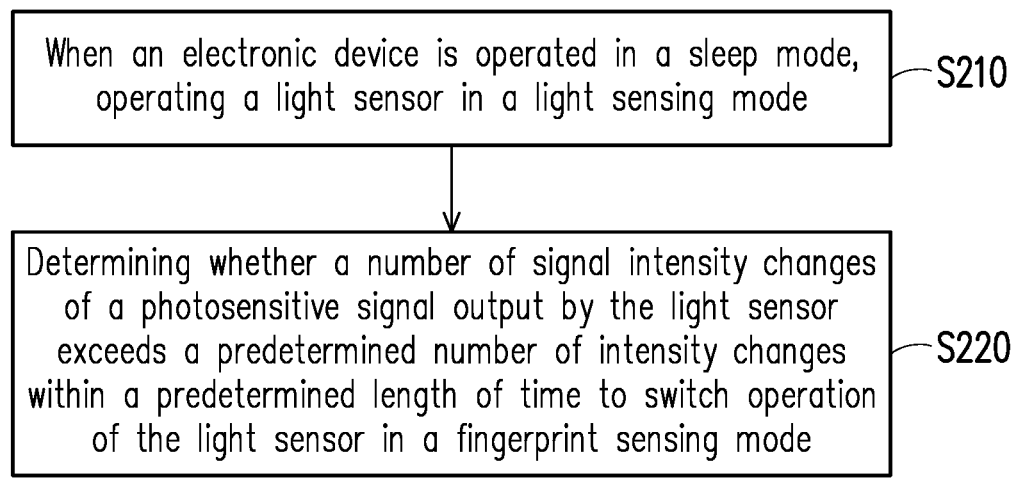
FIG. 2 is a flowchart of a fingerprint sensing method according to an embodiment of the disclosure.

FIG. 2 is a flowchart of a fingerprint sensing method according to an embodiment of the disclosure. Referring to FIG. 1 and FIG. 2, the image sensing device 110 may execute steps S210 to step S220 below. In step S210, when the electronic device 100 is operated in a sleep mode (or other low power consumption mode such as a standby mode or a black screen mode), the controller 111 may operate the light sensor in the light sensing mode. Note that in the embodiment, when a current sensing environment is a light state environment, the controller 111 may not turn on the light source 130 first. Conversely, when the current sensing environment is a dark state environment, the controller 111 may turn on the light source 130 first. In step S220, the controller 111 may determine whether a number of signal intensity changes of a photosensitive signal output by the light sensor 112 exceeds a predetermined number of intensity changes within a predetermined length of time to switch operation of the light sensor 112 in the fingerprint sensing mode. In other words, if the finger of the user, for example, actively and repeatedly covers on the light sensor 112 and moves away for several times to cause the number of the signal intensity changes of the photosensitive signal output by the light sensor 112 to exceed the predetermined number of intensity changes within the predetermined length of time, the controller 111 determines that the user desires to wake and use the electronic device 100. Hence, the operation of the light sensor 112 may be switched to the fingerprint sensing mode. Conversely, if the number of the signal intensity changes of the photosensitive signal output by the light sensor 112 does not exceed the predetermined number of intensity changes within the predetermined length of time, the controller 111 determines that the user accidentally touches the light sensor 112. Hence, the operation of the light sensor 112 may not be switched to the fingerprint sensing mode, and the processor 120 of the electronic device 100 is not woken. Therefore, the image sensing device 110 and the fingerprint sensing method of the embodiment may effectively prevent unnecessary power consumption generated by the electronic device 100 due to an accidental touch of the user.

Figure 3:
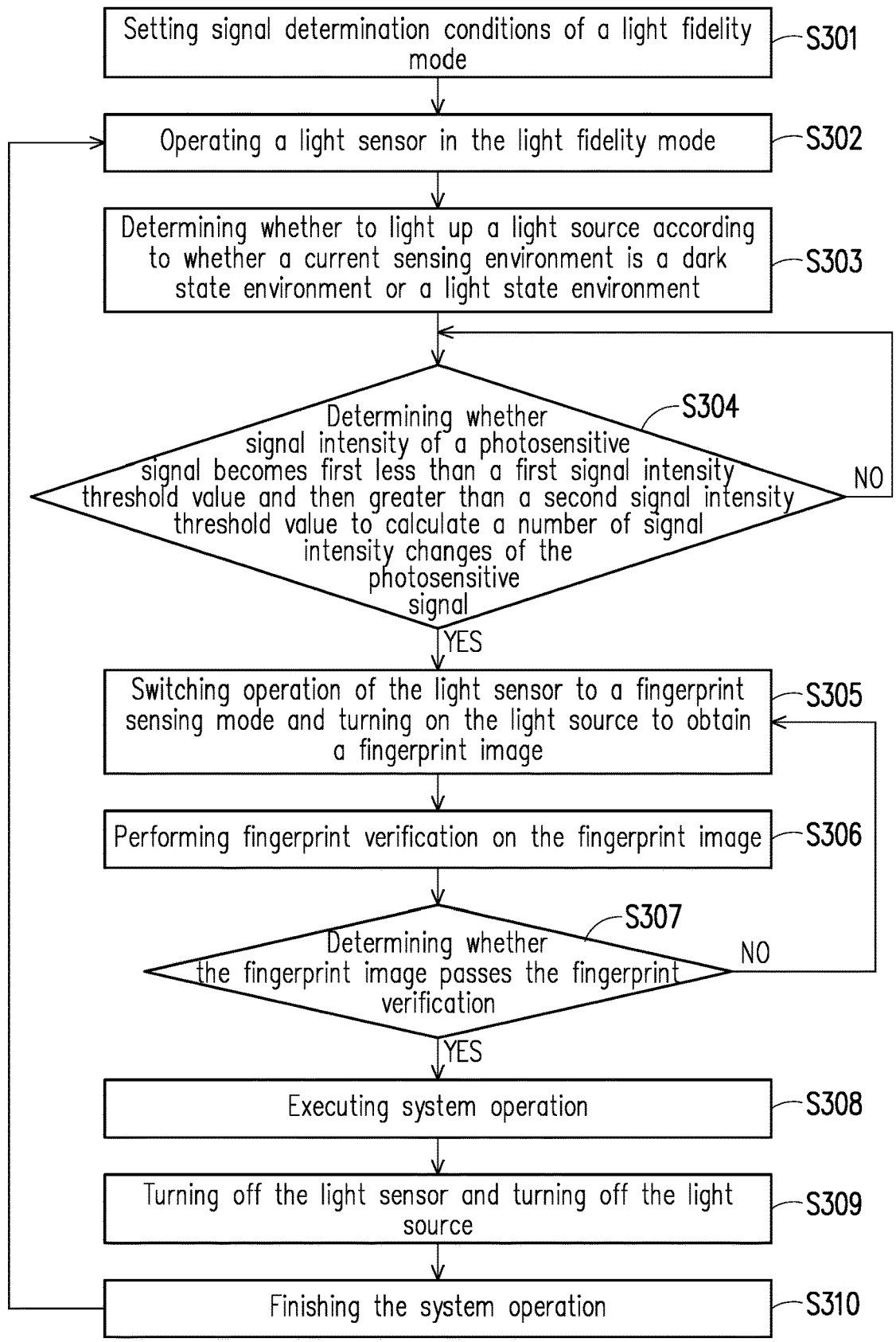
FIG. 3 is a flowchart of a fingerprint sensing method according to a first embodiment of the disclosure.
Figure 4A:
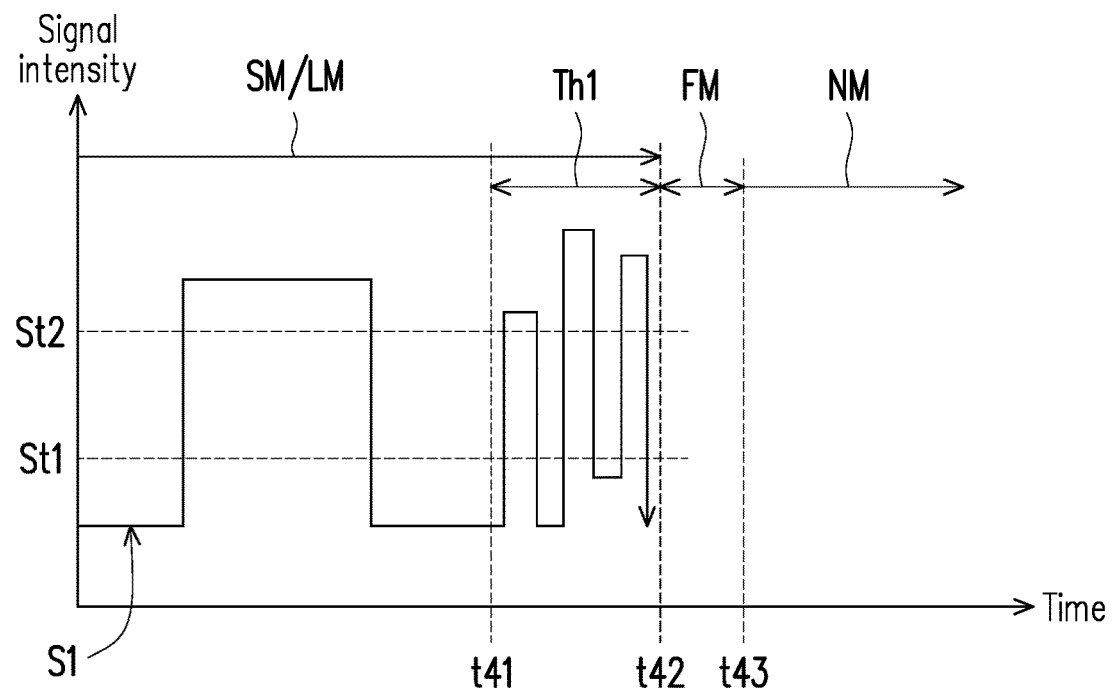
FIG. 4A is a schematic diagram of signal intensity changes of a photosensitive signal in a dark state environment according to a first embodiment of the disclosure.

FIG. 3 is a flowchart of a fingerprint sensing method according to a first embodiment of the disclosure. FIG. 4A is a schematic diagram of signal intensity changes of a photosensitive signal in a dark state environment according to the first embodiment of the disclosure. Referring to FIG. 1, FIG. 3, and FIG. 4A, for example, the light sensing mode is the light fidelity mode, and a current sensing environment is a dark state environment. In the embodiment, in the dark state environment, the image sensing device 110 may execute step S301 to step S310 below. In step S301, the controller 111 may set signal determination conditions of the light fidelity mode. For example, the controller 111 may predetermine a first signal intensity threshold value St1 and a second signal intensity threshold value St2 and, for example, set a predetermined number of intensity changes as twice and a predetermined length of time as Th1. The second signal intensity threshold value St2 is greater than the first signal intensity threshold value St1. When signal intensity of a photosensitive signal S1 continuously output by one of or a part of the sensing pixels of the light sensor 112 is greater than the second signal intensity threshold value St2, it means that a received light fidelity value is "1". When the signal intensity of the photosensitive signal S1 continuously output by one of or the part of the sensing pixels of the light sensor 112 is less than the first signal intensity threshold value St1, it means that the received light fidelity value is "0". In step S302, before time t42, the electronic device 100 may be operated in the sleep mode in, for example, a sleep period SM, and the controller 111 may operate the light sensor 112 in the light fidelity mode in a light fidelity period LM so that the light sensor 112 continuously detects a light signal intensity change through at least one of the multiple sensing pixels and output the photosensitive signal S1.

In step S303, it may determine whether the light source 130 is lit up according to whether the current sensing environment is a dark state environment or a light state environment. As shown in FIG. 4A, since the current sensing environment is the dark state environment (an initial signal intensity of the photosensitive signal S1 is relatively low), the user may turn on the light source 130 manually by turning on a corresponding hardware switch. The controller 111 may also automatically detect that the current sensing environment is the dark state environment through the light sensor 112 or another environment light sensor to automatically turn on the light source 130. In step S304, the controller 111 determines whether signal intensity of the photosensitive signal S1 first becomes less than the first signal intensity threshold value St1 and then greater than the second signal intensity threshold value St2 to calculate whether a number of signal intensity changes of the photosensitive signal S1 exceeds the predetermined number of intensity changes.

As shown in FIG. 4A, before time t41, the signal intensity of the photosensitive signal S1 may change, but the number of signal intensity changes of the photosensitive signal S1 does not meet previous determination of the number of signal intensity changes of the photosensitive signal S1. Hence, the controller 111 does not perform other movements and continues executing step S304 to maintain the light sensor 112 to be operated in the light fidelity mode. During the time t41 to the time t42, the number (3 times) of signal intensity changes of the photosensitive signal S1 in the predetermined length of time Th1 exceeds the predetermined number (twice) of intensity changes. Hence, the controller 111 executes step S305. The user, for example, puts his finger on the light sensor 112 first and presses rapidly on the light sensor 112 for three times, and a change in a light fidelity value is, for example, "0101010". In step S305, during the time t42 to time t43, the controller 111 may switch the operation of the light sensor 112 to the fingerprint sensing mode in a fingerprint sensing period FM and turn on the light source 130 (to provide the illuminating light to illuminate a sensing target region of the finger) to obtain a fingerprint image (an image of the sensing target region of the finger).

In the embodiment, during the time t42 to the time t43, when the controller 111 switches the operation of the light sensor 112 to the fingerprint sensing mode, the controller 111 may output a waking signal to the processor 120 of the electronic device 100 to wake the electronic device 100. The processor 120 of the electronic device 100 may further illuminate the display panel to provide the illuminating light required for fingerprint sensing. Next, the controller 111 may provide the fingerprint image to the electronic device 100 so that the electronic device 100 performs fingerprint verification on the fingerprint image. In step S306, the processor 120 of the electronic device 100 may perform the fingerprint verification on the fingerprint image. In step S307, the processor 120 of the electronic device 100 may determine whether the fingerprint image passes the fingerprint verification. If not, the controller 111 may execute step S305 again to obtain a new fingerprint image. In an embodiment, if a number of fingerprint sensing operation times executed by the controller 111 exceeds a predetermined number, the controller 111 may directly finish the fingerprint sensing mode and resume executing the light fidelity mode, and the electronic device 100 may re-enter the sleep mode. If yes, the processor 120 of the electronic device 100 determines that the fingerprint image passes the fingerprint verification.

In step S308, after the time t43, the processor 120 of the electronic device 100 may execute system operation of the electronic device 100 in a normal operation period NM (e.g. entering an operating system image to execute a related system function). In step S309, the processor 120 of the electronic device 100 may turn off the image sensing device 110, and turn off the light source 130, or notify the controller 111 to turn off the light sensor 112. The electronic device 100 may be operated in a normal mode to execute further operation. In step S310, the user finishes operating the electronic device 100 so that the controller 111 may execute step S302 again to detect the light signal intensity change again after the system operation of the electronic device 100 is finished. Therefore, in a case where the current sensing environment is the dark state environment, the image sensing device 110 and the fingerprint sensing method of the embodiment may effectively prevent unnecessary power consumption generated by the electronic device 100 due to an accidental touch of the user.

Figure 4B:
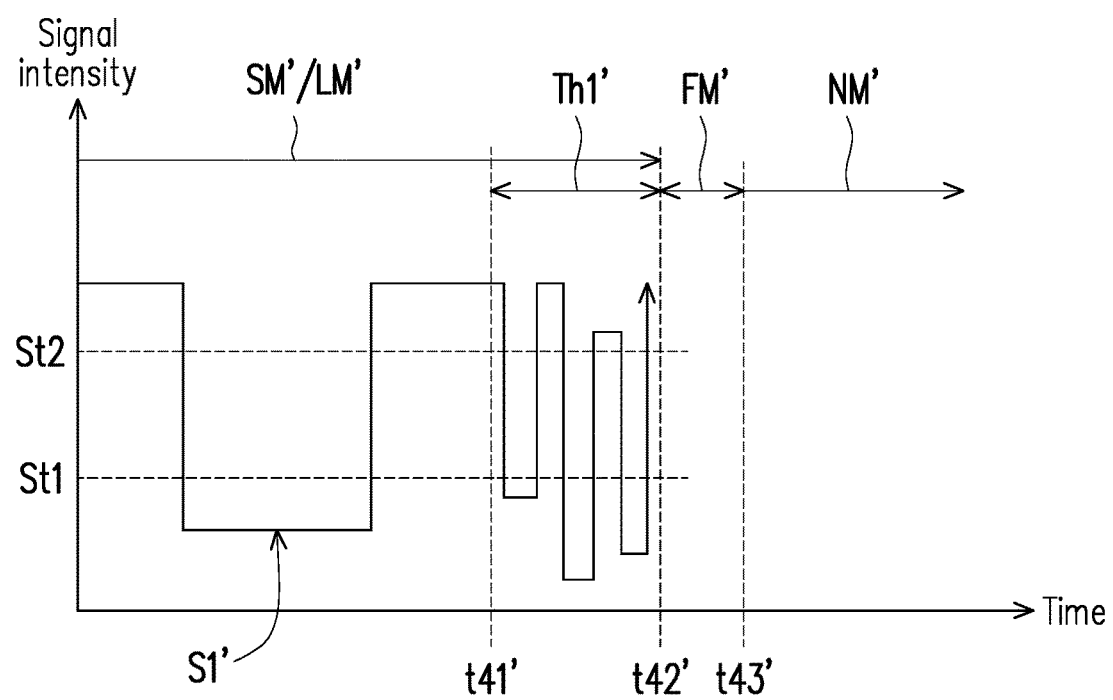
FIG. 4B is a schematic diagram of signal intensity changes of a photosensitive signal in a light state environment according to a first embodiment of the disclosure.

FIG. 4B is a schematic diagram of signal intensity changes of a photosensitive signal in a light state environment according to the first embodiment of the disclosure. Referring to FIG. 1, FIG. 3, and FIG. 4B, for example, the light sensing mode is the light fidelity mode, and the current sensing environment is a light state environment. In the embodiment, in the light state environment, the image sensing device 110 may execute step S301 to step S310 below in the same way. In step S301, the controller 111 may set the signal determination conditions of the light fidelity mode. For example, the controller 111 may predetermine the first signal intensity threshold value St1 and the second signal intensity threshold value St2 and, for example, set the predetermined number of intensity changes as twice and a predetermined length of time as Th1'. When signal intensity of a photosensitive signal S1' continuously output by one of or the part of the sensing pixels of the light sensor 112 is greater than the second signal intensity threshold value St2, it means that the received light fidelity value is "1". When the signal intensity of the photosensitive signal S1' continuously output by one of or the part of the sensing pixels of the light sensor 112 is less than the first signal intensity threshold value St1, it means that the received light fidelity value is "0". In step S302, before time t42', the electronic device 100 may be operated in the sleep mode in, for example, a sleep period SM', and the controller 111 may operate the light sensor 112 in the light fidelity mode in a light fidelity period LM' so that the light sensor 112 continuously detects the light signal intensity change through at least one of the multiple sensing pixels and output the photosensitive signal SF.

In step S303, it may determine whether the light source 130 is lit up according to whether the current sensing environment is the dark state environment or the light state environment. As shown in FIG. 4B, since the current sensing environment is the light state environment (an initial signal intensity of the photosensitive signal SF is relatively high), the light source 130 may not be turned on first. In step S304, the controller 111 determines whether signal intensity of the photosensitive signal SF first becomes less than the first signal intensity threshold value St1 and then greater than the second signal intensity threshold value St2 to calculate whether a number of signal intensity changes of the photosensitive signal SF exceeds the predetermined number of intensity changes.

As shown in FIG. 4B, before time t41', the signal intensity of the photosensitive signal S1' may change, but the number of signal intensity changes of the photosensitive signal S1' does not meet previous determination of the number of signal intensity changes of the photosensitive signal S1'. Hence, the controller 111 does not perform other movements and continues executing step S304 to maintain the light sensor 112 to be operated in the light fidelity mode. During the time t41' to the time t42', the number (3 times) of the signal intensity changes of the photosensitive signal S1' in the predetermined length of time Th1' exceeds the predetermined number (twice) of intensity changes. Hence, the controller 111 executes step S305. The user, for example, puts his finger on the light sensor 112 first and presses rapidly on the light sensor 112 for three times, and a change in a light fidelity value is, for example, "1010101". In step S305, during the time t42' to time t43', the controller 111 may switch the operation of the light sensor 112 to the fingerprint sensing mode in a fingerprint sensing period FM' and turn on the light source 130 (to provide the illuminating light to illuminate the sensing target region of the finger) to obtain the fingerprint image (the image of the sensing target region of the finger).

In the embodiment, during the time t42' to the time t43', when the controller 111 switches the operation of the light sensor 112 to the fingerprint sensing mode, the controller 111 may output the waking signal to the processor 120 of the electronic device 100 to wake the electronic device 100. The processor 120 of the electronic device 100 may further illuminate the display panel to provide the illuminating light required for fingerprint sensing. Next, the controller 111 may provide the fingerprint image to the electronic device 100 so that the electronic device 100 performs the fingerprint verification on the fingerprint image. In step S306, the processor 120 of the electronic device 100 may perform the fingerprint verification on the fingerprint image. In step S307, the processor 120 of the electronic device 100 may determine whether the fingerprint image passes the fingerprint verification. If not, the controller 111 may execute step S305 again to obtain a new fingerprint image. In an embodiment, if the number of the fingerprint sensing operation times executed by the controller 111 exceeds the predetermined number, the controller 111 may directly finish the fingerprint sensing mode and resume executing the light fidelity mode, and the electronic device 100 may re-enter the sleep mode. If yes, the processor 120 of the electronic device 100 determines that the fingerprint image passes the fingerprint verification.

In step S308, after the time t43', the processor 120 of the electronic device 100 may execute the system operation of the electronic device 100 in a normal operation period NM' (e.g. entering the operating system image to execute the related system function). In step S309, the processor 120 of the electronic device 100 may turn off the image sensing device 110, and turn off the light source 130, or notify the controller 111 to turn off the light sensor 112. The electronic device 100 may be operated in the normal mode to execute further operation. In step S310, the user finishes operating the electronic device 100 so that the controller 111 may execute step S302 again to detect the light signal intensity change again after the system operation of the electronic device 100 is finished. Therefore, in a case where the current sensing environment is the light state environment, the image sensing device 110 and the fingerprint sensing method of the embodiment may effectively prevent the unnecessary power consumption generated by the electronic device 100 due to the accidental touch of the user.

Figure 5:
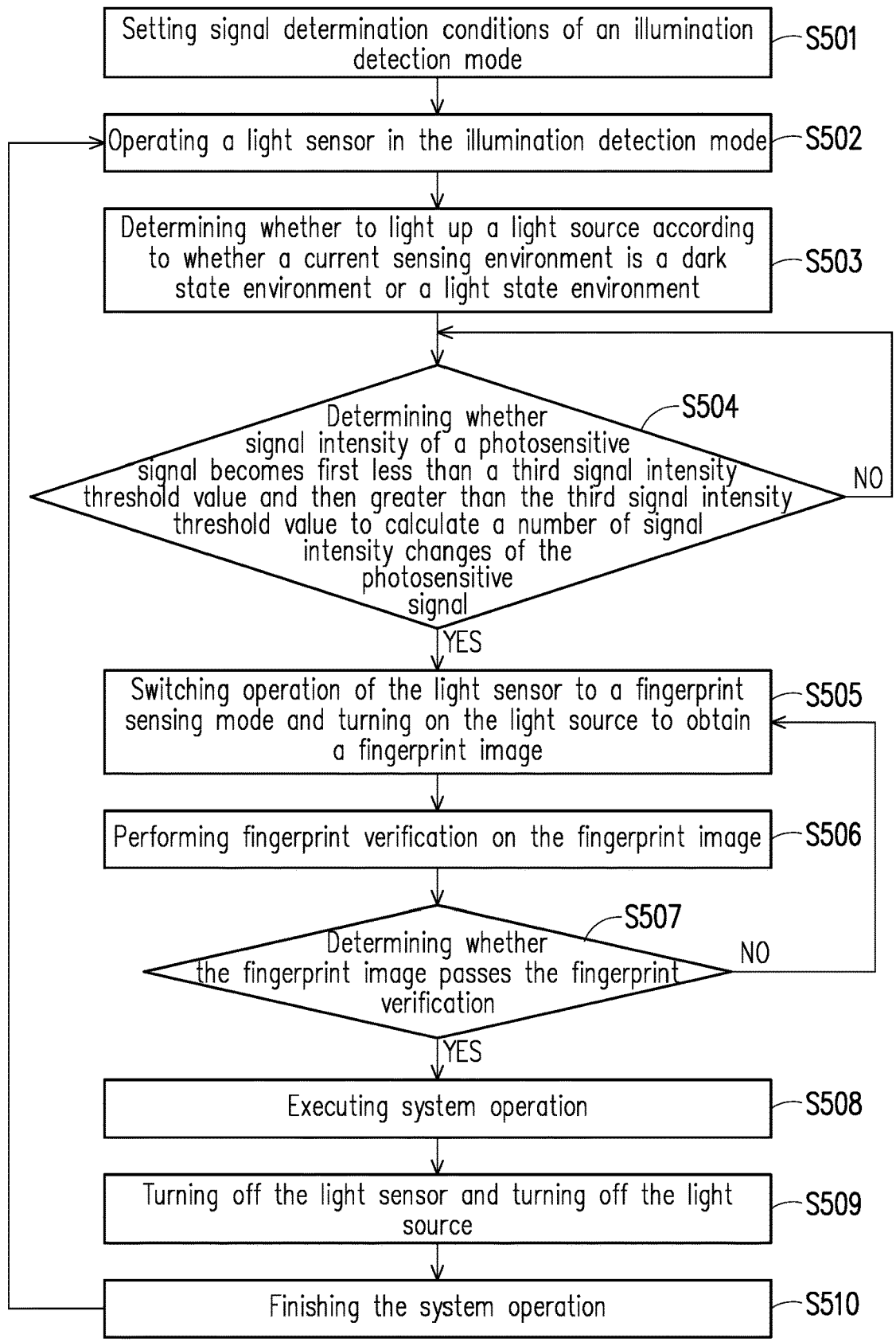
FIG. 5 is a flowchart of a fingerprint sensing method according to a second embodiment of the disclosure.
Figure 6A:
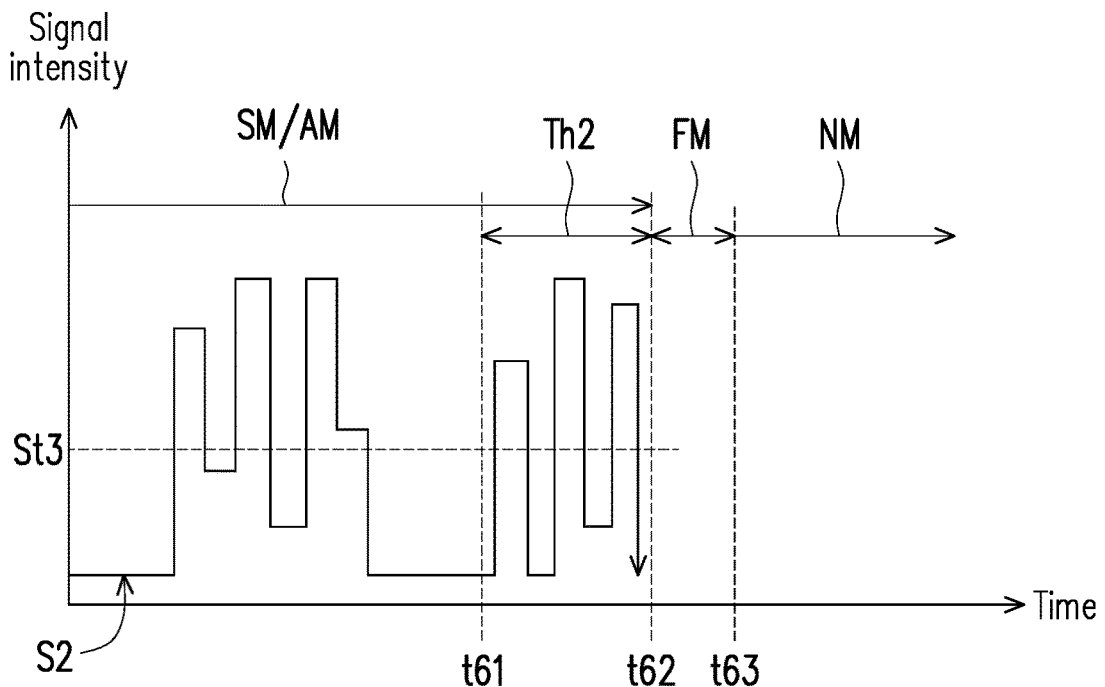
FIG. 6A is a schematic diagram of signal intensity changes of a photosensitive signal in a dark state environment according to a second embodiment of the disclosure.

FIG. 5 is a flowchart of a fingerprint sensing method according to a second embodiment of the disclosure. FIG. 6A is a schematic diagram of signal intensity changes of a photosensitive signal in a dark state environment according to a second embodiment of the disclosure. Referring to FIG. 1, FIG. 5, and FIG. 6A, for example, the light sensing mode is the illumination detection mode, and a current sensing environment is a dark state environment. In the embodiment, in the dark state environment, the image sensing device 110 may execute step S501 to step S510 below. In step S501, the controller 111 may set signal determination conditions of the illumination detection mode. For example, the controller 111 may predetermine a third signal intensity threshold value St3 and, for example, set a predetermined number of intensity changes as twice and a predetermined length of time as Th2. When signal intensity of a photosensitive signal S2 continuously output by one of or the part of the sensing pixels of the light sensor 112 is less than the third signal intensity threshold value St3, it means that the finger of the user blocks the light sensor 112 so that the light sensor 112 is in a state where an environment light at a relatively low illumination is received. When the signal intensity of the photosensitive signal S2 continuously output by one of or the part of the sensing pixels of the light sensor 112 is greater than or equal the third signal intensity threshold value St3, it means that the finger of the user does not block the light sensor 112 so that the light sensor 112 is in a state where an environment light at a relatively high illumination is received. In step S502, before time t62, the electronic device 100 may be operated in the sleep mode in, for example, the sleep period SM, and the controller 111 may operate the light sensor 112 in the illumination detection mode in an illumination detection period AM so that the light sensor 112 continuously detects the light signal intensity change through at least one of the multiple sensing pixels and output the photosensitive signal S2.

In step S503, it may determine whether the light source 130 is lit up according to whether the current sensing environment is a dark state environment or a light state environment. As shown in FIG. 6A, since the current sensing environment is the dark state environment (an initial signal intensity of the photosensitive signal S2 is relatively low), the user may turn on the light source 130 manually by turning on the corresponding hardware switch. The controller 111 may also automatically detect that the current sensing environment is the dark state environment through the light sensor 112 or another environment light sensor to automatically turn on the light source 130. In step S504, the controller 111 determines whether signal intensity of the photosensitive signal S2 first becomes less than the third signal intensity threshold value St3 and then greater than the third signal intensity threshold value St3 to calculate whether a number of signal intensity changes of the photosensitive signal S2 exceeds the predetermined number of intensity changes.

As shown in FIG. 6A, before time t61, the signal intensity of the photosensitive signal S2 may change, but the number of signal intensity changes of the photosensitive signal S2 does not meet previous determination of the number of signal intensity changes of the photosensitive signal S2. Hence, the controller 111 does not perform other movements and continues executing step S504 to maintain the light sensor 112 to be operated in the illumination detection mode. During the time t61 to the time t62, the number (3 times) of the signal intensity changes of the photosensitive signal S2 in the predetermined length of time Th2 exceeds the predetermined number (twice) of intensity changes. Hence, the controller 111 executes step S505. The user, for example, puts his finger on the light sensor 112 first and presses rapidly on the light sensor 112 for three times. In step S505, during the time t62 to time t63, the controller 111 may switch the operation of the light sensor 112 to the fingerprint sensing mode in the fingerprint sensing period FM and turn on the light source 130 (to provide the illuminating light to illuminate the sensing target region of the finger) to obtain the fingerprint image (the image of the sensing target region of the finger).

In the embodiment, during the time t62 to the time t63, when the controller 111 switches the operation of the light sensor 112 to the fingerprint sensing mode, the controller 111 may output the waking signal to the processor 120 of the electronic device 100 to wake the electronic device 100. The processor 120 of the electronic device 100 may further illuminate the display panel to provide the illuminating light required for fingerprint sensing. Next, the controller 111 may provide the fingerprint image to the electronic device 100 so that the electronic device 100 performs the fingerprint verification on the fingerprint image. In step S506, the processor 120 of the electronic device 100 may perform the fingerprint verification on the fingerprint image. In step S507, the processor 120 of the electronic device 100 may determine whether the fingerprint image passes the fingerprint verification. If not, the controller 111 may execute step S505 again to obtain a new fingerprint image. In an embodiment, if the number of fingerprint sensing operation times executed by the controller 111 exceeds the predetermined number, the controller 111 may directly finish the fingerprint sensing mode and resume executing the illumination detection mode, and the electronic device 100 may re-enter the sleep mode. If yes, the processor 120 of the electronic device 100 determines that the fingerprint image passes the fingerprint verification.

In step S508, after the time t63, the processor 120 of the electronic device 100 may execute the system operation of the electronic device 100 in the normal operation period NM (e.g. entering the operating system image to execute the related system function). In step S509, the processor 120 of the electronic device 100 may turn off the image sensing device 110, and turn off the light source 130, or notify the controller 111 to turn off the light sensor 112. The electronic device 100 may be operated in the normal mode to execute further operation. In step S510, the user finishes operating the electronic device 100 so that the controller 111 may execute step S502 again to detect the light signal intensity change again after the system operation of the electronic device 100 is finished. Therefore, in a case where the current sensing environment is the dark state environment, the image sensing device 110 and the fingerprint sensing method of the embodiment may effectively prevent the unnecessary power consumption generated by the electronic device 100 due to the accidental touch of the user.

Figure 6B:
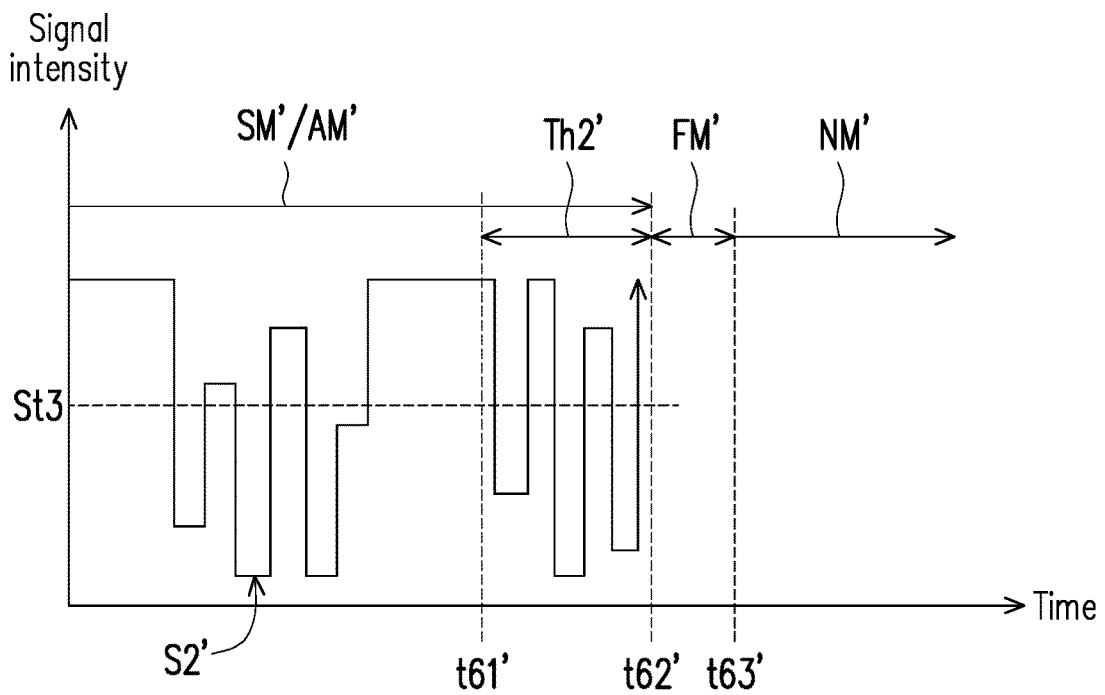
FIG. 6B is a schematic diagram of signal intensity changes of a photosensitive signal in a light state environment according to a second embodiment of the disclosure.

FIG. 6B is a schematic diagram of signal intensity changes of a photosensitive signal in a light state environment according to the second embodiment of the disclosure. Referring to FIG. 1, FIG. 5, and FIG. 6B, for example, the light sensing mode is the illumination detection mode, and the current sensing environment is a light state environment. In the embodiment, in the light state environment, the image sensing device 110 may execute step S501 to step S510 below in the same way. In step S501, the controller 111 may set the signal determination conditions of the illumination detection mode. For example, the controller 111 may predetermine the third signal intensity threshold value St3 and, for example, set the predetermined number of intensity changes as twice and a predetermined length of time as Th2'. When signal intensity of a photosensitive signal S2' continuously output by one of or the part of the sensing pixels of the light sensor 112 is less than the third signal intensity threshold value St3, it means that the finger of the user blocks the light sensor 112 so that the light sensor 112 is in a state where an environment light at a relatively low illumination is received. When the signal intensity of the photosensitive signal S2' continuously output by one of or the part of the sensing pixels of the light sensor 112 is greater than or equal the third signal intensity threshold value St3, it means that the finger of the user does not block the light sensor 112 so that the light sensor 112 is in a state where an environment light at a relatively high illumination is received. In step S502, before time t62', the electronic device 100 may be operated in the sleep mode in, for example, a sleep period SM', and the controller 111 may operate the light sensor 112 in the illumination detection mode in an illumination detection period AM' so that the light sensor 112 continuously detects the light signal intensity change through at least one of the multiple sensing pixels and output the photosensitive signal S2'.

In step S503, it may determine whether the light source 130 is lit up according to whether the current sensing environment is the dark state environment or the light state environment. As shown in FIG. 6B, since the current sensing environment is the light state environment (an initial signal intensity of the photosensitive signal S2' is relatively high), the light source 130 may not be turned on first. In step S504, the controller 111 determines whether signal intensity of the photosensitive signal S2' first becomes less than the third signal intensity threshold value St3 and then greater than the third signal intensity threshold value St3 to calculate whether a number of signal intensity changes of the photosensitive signal S2' exceeds the predetermined number of intensity changes.

As shown in FIG. 6B, before time t61', the signal intensity of the photosensitive signal S2' may change, but the number of signal intensity changes of the photosensitive signal S2' does not meet previous determination of the number of signal intensity changes of the photosensitive signal S2'. Hence, the controller 111 does not perform other movements and continues executing step S504 to maintain the light sensor 112 to be operated in the illumination detection mode. During the time t61' to the time t62', the number (3 times) of the signal intensity changes of the photosensitive signal S2' in the predetermined length of time Th2' exceeds the predetermined number (twice) of intensity changes. Hence, the controller 111 executes step S505. The user, for example, puts his finger on the light sensor 112 first and presses rapidly on the light sensor 112 for three times. In step S505, during the time t62' to time t63', the controller 111 may switch the operation of the light sensor 112 to the fingerprint sensing mode in the fingerprint sensing period FM' and turn on the light source 130 (to provide the illuminating light to illuminate the sensing target region of the finger) to obtain the fingerprint image (the image of the sensing target region of the finger).

In the embodiment, during the time t62' to the time t63', when the controller 111 switches the operation of the light sensor 112 to the fingerprint sensing mode, the controller 111 may output the waking signal to the processor 120 of the electronic device 100 to wake the electronic device 100. The processor 120 of the electronic device 100 may further illuminate the display panel to provide the illuminating light required for fingerprint sensing. Next, the controller 111 may provide the fingerprint image to the electronic device 100 so that the electronic device 100 performs the fingerprint verification on the fingerprint image. In step S506, the processor 120 of the electronic device 100 may perform the fingerprint verification on the fingerprint image. In step S507, the processor 120 of the electronic device 100 may determine whether the fingerprint image passes the fingerprint verification. If not, the controller 111 may execute step S505 again to obtain a new fingerprint image. In an embodiment, if the number of fingerprint sensing operation times executed by the controller 111 exceeds the predetermined number, the controller 111 may directly finish the fingerprint sensing mode and resume executing the illumination detection mode, and the electronic device 100 may re-enter the sleep mode. If yes, the processor 120 of the electronic device 100 determines that the fingerprint image passes the fingerprint verification.

In step S508, after the time t63', the processor 120 of the electronic device 100 may execute the system operation of the electronic device 100 in the normal operation period NM' (e.g. entering the operating system image to execute the related system function). In step S509, the processor 120 of the electronic device 100 may turn off the image sensing device 110, and turn off the light source 130, or notify the controller 111 to turn off the light sensor 112. The electronic device 100 may be operated in the normal mode to execute further operation. In step S510, the user finishes operating the electronic device 100 so that the controller 111 may execute step S502 again to detect the light signal intensity change again after the system operation of the electronic device 100 is finished. Therefore, in a case where the current sensing environment is the light state environment, the image sensing device 110 and the fingerprint sensing method of the embodiment may effectively prevent the unnecessary power consumption generated by the electronic device 100 due to the accidental touch of the user.

In summary of the above, in the image sensing device and the fingerprint sensing method of the disclosure, when the electronic device is operated in the sleep mode, the light sensor may be operated in the light sensing mode with low power consumption, and it is determined whether to switch the operation of the light sensor in the fingerprint sensing mode and wake the electronic device according to whether the number of the signal intensity changes of the photosensitive signal output by the light sensor exceeds the predetermined number of intensity changes within the predetermined length of time. Therefore, the image sensing device and the fingerprint sensing method of the disclosure may effectively prevent the electronic device from being woken to perform fingerprint sensing due to the accidental touch of the user, thereby effectively reducing the power consumption of the electronic device.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. An image sensing device suitable for being installed in an electronic device, wherein the image sensing device comprises:
    a light sensor; and
    a controller coupled to the light sensor,
        wherein, in response to the electronic device being operated in a sleep mode, the controller operates the light sensor in a light sensing mode, and the controller determines whether a number of signal intensity changes of a photosensitive signal output by the light sensor exceeds a predetermined number of intensity changes within a predetermined length of time to switch operation of the light sensor in a fingerprint sensing mode,
        wherein the controller determines whether signal intensity of the photosensitive signal first becomes less than a first signal intensity threshold value and then greater than a second signal intensity threshold value to calculate the number of the signal intensity changes of the photosensitive signal, and
        wherein the second signal intensity threshold value is greater than the first signal intensity threshold value.

2. The image sensing device according to claim 1, wherein, in response to the light sensor being in the light sensing mode, it is determined whether a light source is lit up to illuminate a finger according to whether a current sensing environment is a dark state environment or a light state environment, and in response to the controller switching the operation of the light sensor in the fingerprint sensing mode, the controller outputs a waking signal to a processor of the electronic device to wake the electronic device.

3. The image sensing device according to claim 2, wherein in response to the electronic device being woken and the light sensor performing fingerprint sensing, the electronic device simultaneously lights up the light source so that the controller obtains a fingerprint image of the finger through the light sensor.

4. The image sensing device according to claim 3, wherein the controller provides the fingerprint image to the electronic device so that the electronic device performs fingerprint verification on the fingerprint image, and in response to the fingerprint image passing the fingerprint verification, the electronic device turns off the image sensing device and the light source.

5. The image sensing device according to claim 1, wherein the controller determines whether signal intensity of the photosensitive signal first becomes less than a third signal intensity threshold value and then greater than the third signal intensity threshold value to calculate the number of the signal intensity changes of the photosensitive signal.

6. The image sensing device according to claim 1, wherein, in response to the light sensor being operated in the light sensing mode, the light sensor continuously detects a light signal intensity change through at least one of a plurality of sensing pixels.

7. The image sensing device according to claim 1, wherein in response to the light sensor being operated in the fingerprint sensing mode, the light sensor performs fingerprint sensing through all of a plurality of sensing pixels to obtain a fingerprint image.

8. The image sensing device according to claim 1, wherein the light sensing mode is a light fidelity mode.

9. The image sensing device according to claim 1, wherein the light sensing mode is an illumination detection mode.

10. A fingerprint sensing method, comprising:
    in response to an electronic device being operated in a sleep mode, operating a light sensor in a light sensing mode; and
    determining whether a number of signal intensity changes of a photosensitive signal output by the light sensor exceeds a predetermined number of intensity changes within a predetermined length of time to switch operation of the light sensor in a fingerprint sensing mode,
    wherein determining the number of the signal intensity changes of the photosensitive signal output by the light sensor comprises:
        determining whether signal intensity of the photosensitive signal first becomes less than a first signal intensity threshold value and then greater than a second signal intensity threshold value to calculate the number of the signal intensity changes of the photosensitive signal, and
        wherein the second signal intensity threshold value is greater than the first signal intensity threshold value.

11. The fingerprint sensing method according to claim 10, further comprising:
    in response to the light sensor being in the light sensing mode, determining whether a light source is lit up to illuminate a finger according to whether a current sensing environment is a dark state environment or a light state environment; and in response to the operation of the light sensor being switched in the fingerprint sensing mode, outputting a waking signal to a processor of the electronic device to wake the electronic device.

12. The fingerprint sensing method according to claim 11, further comprising:
in response to the electronic device being woken and the light sensor performing fingerprint sensing, simultaneously lighting up the light source so that the light sensor obtains a fingerprint image of the finger.

13. The fingerprint sensing method according to claim 12, further comprising:
providing the fingerprint image to the electronic device so that the electronic device performs fingerprint verification on the fingerprint image; and
in response to the fingerprint image passing the fingerprint verification, turning off the light sensor and the light source.

14. The fingerprint sensing method according to claim 10, wherein determining the number of the signal intensity changes of the photosensitive signal output by the light sensor comprises:
determining whether signal intensity of the photosensitive signal first becomes less than a third signal intensity threshold value and then greater than the third signal intensity threshold value to calculate the number of the signal intensity changes of the photosensitive signal.

15. The fingerprint sensing method according to claim 10, wherein, in response to the light sensor being operated in the light sensing mode, the light sensor continuously detects a light signal intensity change through at least one of a plurality of sensing pixels.

16. The fingerprint sensing method according to claim 10, wherein in response to the light sensor being operated in the fingerprint sensing mode, the light sensor performs fingerprint sensing through all of a plurality of sensing pixels to obtain a fingerprint image.

17. The fingerprint sensing method according to claim 10, wherein the light sensing mode is a light fidelity mode.

18. The fingerprint sensing method according to claim 10, wherein the light sensing mode is an illumination detection mode.

* * * * *